Oct. 23, 1973 S. N. SMITH 3,767,739
METHOD FOR MAKING A SHAFT SEAL WITH AN
ALMOST ENTIRELY MOLDED LIP
Filed Nov. 8, 1971 2 Sheets-Sheet 1
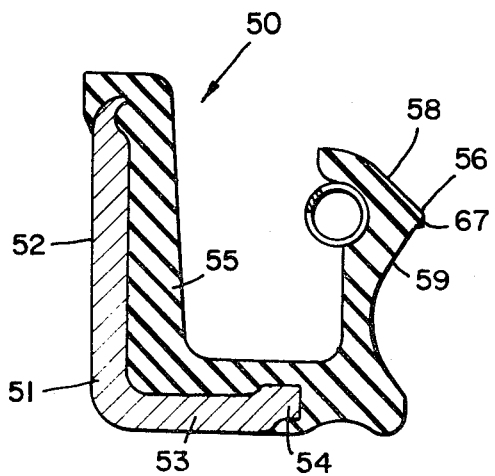
FIG_1
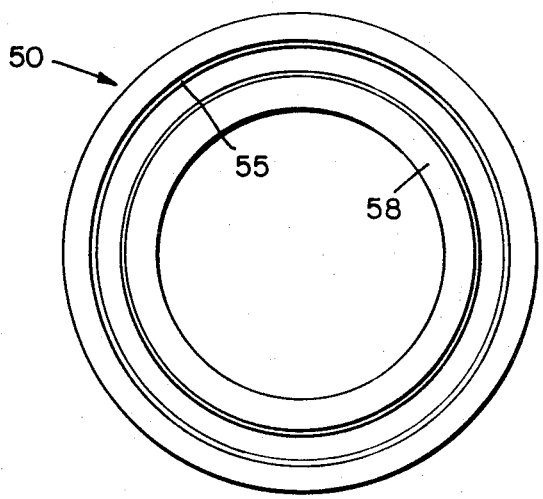
FIG_2
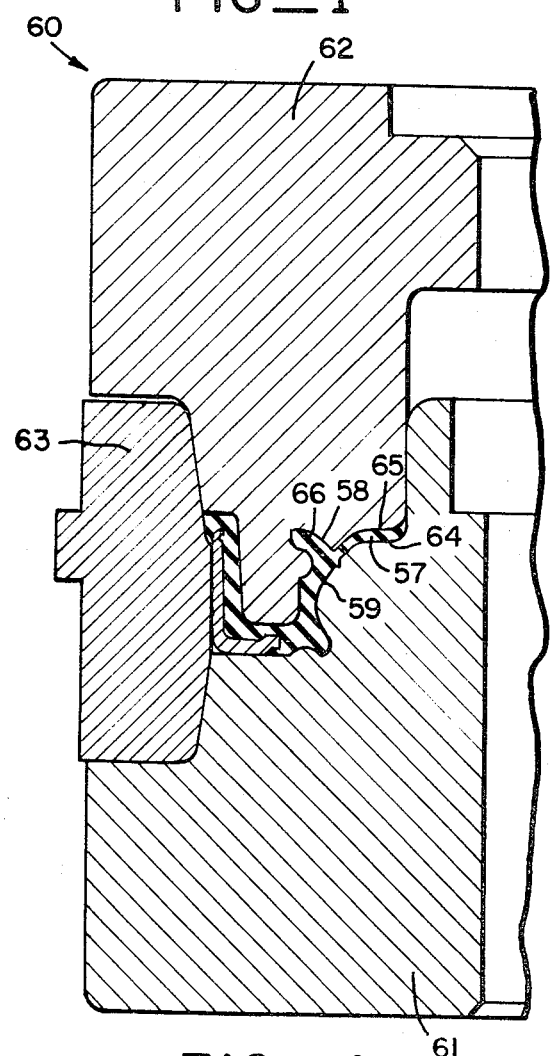
FIG_4
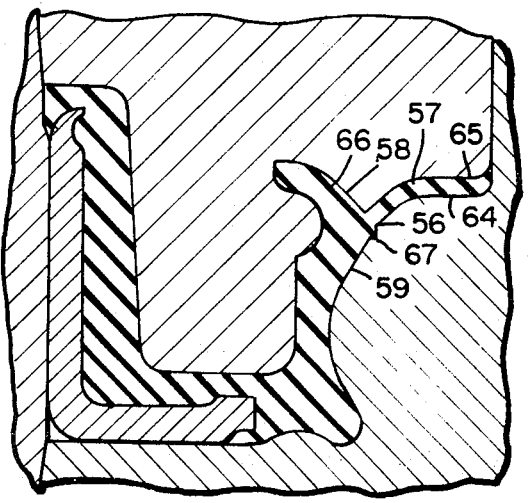
FIG_3
INVENTOR.
STANLEY N. SMITH
BY Robert E. Wickersham
ATTORNEYS Oct. 23, 1973　　　　　　S. N. SMITH　　　　　3,767,739
METHOD FOR MAKING A SHAFT SEAL WITH AN
ALMOST ENTIRELY MOLDED LIP
Filed Nov. 8, 1971　　　　　　　　　　　　　2 Sheets-Sheet 2
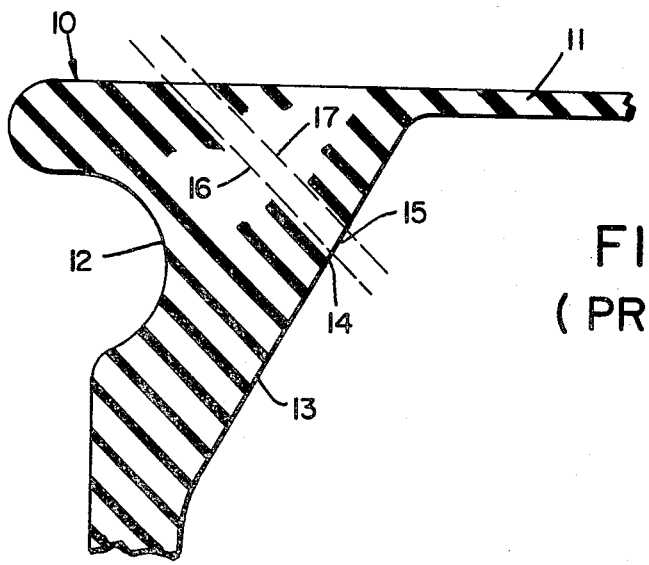
FIG_5
(PRIOR ART)
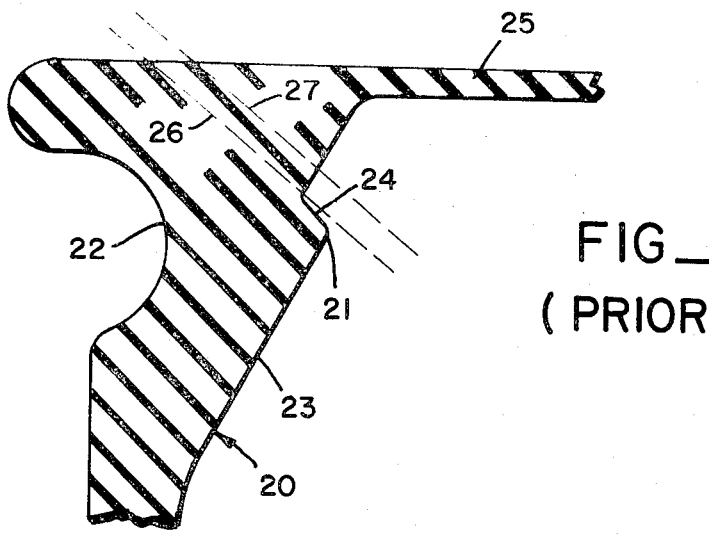
FIG_6
(PRIOR ART)
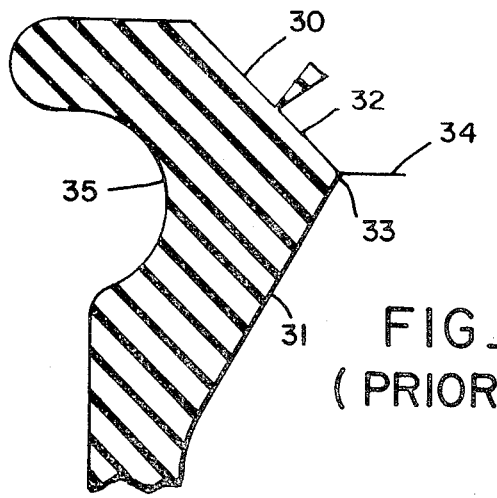
FIG_7
(PRIOR ART)
INVENTOR.
STANLEY N. SMITH
BY
ATTORNEYS

United States Patent Office 3,767,739
Patented Oct. 23, 1973

3,767,739
METHOD FOR MAKING A SHAFT SEAL WITH AN ALMOST ENTIRELY MOLDED LIP
Stanley N. Smith, Farmington, Mich., assignor to Federal-Mogul Corporation, Southfield, Mich.
Filed Nov. 8, 1971, Ser. No. 196,508
Int. Cl. B29c 17/12
U.S. Cl. 264—161                                  1 Claim

ABSTRACT OF THE DISCLOSURE

A radial shaft seal is molded to provide substantially the entire lip configuration except for a very narrow portion on one side of the lip, from which a hat extends out. The as-molded seal is trimmed to cut off this hat portion substantially in alignment with the major portion of the adjoining lip wall. This provides good goemetrical consistency, including excellent spring-groove-to-contact relationship and make it easier to manufacture the mold used in the process. The process provides for good compound flow, keeps the mold clean, and provides a much more consistent lip configuration than was available heretofore.

BACKGROUND OF THE INVENTION

This invention relates to an improved method for manufacturing radial shaft seals having lips formed by two intersecting frustoconical faces.

For many years the standard in the industry was a fully-trimmed seal. The molded seal was joined to a molded hat, and a knife was used to define the lip, the knife being used on a lathe-like trimming machine. Unfortunately, the trimming could not be completely accurate and could not be fully dependend upon. The lip edges varied within a range of sizes or tolerances, and the relationship between the center of the spring-receiving groove and the contact lip was therefore undependable, so that seals which were drawn accurately on the engineering drawing board and were even molded accurately, were still not accurate after they had been trimmed. The cross section was grossly dependent on trim variation and could not be kept constant.

Fully-molded lips in which there was no trimming have generally had other difficulties, so much so that trimmed lips had a better performance record. The record was good in general over the years, so long as the lips were trimmed properly. The automotive industry, however, has lately insisted upon the lips being molded, because the industry needed to obtain a constant seal cross section. There have been two basic configurations at the contact point of a molded lip seal (1) a small radius, and (2) a sharp corner with flash. The performances of both configurations have been less predictable than for trimmed sharp lips unless hydrodynamic sealing devices are employed in conjunction with them. Part of the trouble has been that the molded lips which had a radius at the corner were unable to be sufficiently sharp. Another trouble was that there tended to be bad flow patterns for the elastomer during molding.

Some companies have made a seal in which directly at the lip edge there has been a very thin meeting point where mold parts mate with flash at this point. They have been able to obtain good geometrical consistency including a satisfactory spring-groove-to-contact relationship; but the flash at the contact point has been inconsistent and has resulted in defects, and the corner has still been difficult to keep sharp and clean.

Molded lips have been made in which there is no trimming at the lip edge itself but when trimming was required a short distance away on one wall, then the juncture with the hat has extended over a substantial area. These seals have been better than the old type of trimmed-lip seals, insofar as the spring-center-to-shaft-contact-edge relationship is concerned, but there have still been substantial cross-sectional variations and difficulties in achieving consistency. Although better than fully trimmed seals, particularly as to the relation of the spring groove to the contact edge, they still have not been good enough. Also, there have been difficulties in maintaining a sharp corner in the mold for the lip edge, because of the blind corner at this point. There has been poor compound flow at the corner, which has tended to cause the production of a substantial number of rejects, and the corner has tended to get dirty and, when dirty, is hard to clean, so that additional rejects have resulted from this cause. The number of mold defects in such parts has therefore substantially increased the cost of producing satisfactory parts.

SUMMARY OF THE INVENTION

The present invention provides a molded lip and a partial trim, in which the trimming is done right along one side of the lip edge, across a very narrow cross section joining the lip to a hat at one wall only. Most of this one wall has a conical surface as molded, and the trimming is done directly in line with this conical surface. As a result, there is good geometrical consistency including an accurate relationship between the spring groove and the contact edge. An advantage is that the mold is easy to make, because there are no blind corners, and there is a good flow of compound in the mold. The mold stays clean because there is no blind corner, so that many mold defects of the prior art have been overcome.

A BRIEF DESCRIPTION OF THE DRAWINGS

In the drawings:

FIG. 1 is an enlarged view in elevation and in section of a finished oil seal made according to the present method.

FIG. 2 is a view in end elevation of the seal of FIG. 1, reduced in scale in comparison with FIG. 1.

FIG. 3 is an enlarged view in section of a portion of the mold.

FIG. 4 is a fragmentary view in elevation and in section of the mold.

FIG. 5 is a diagrammatic view in elevation and in section of a prior-art fully-trimmed seal showing typical trim lines at extremes of a typical tolerance.

FIG. 6 is a similar view of a largely-molded, partially-trimmed lip according to other prior art, showing again the trim tolerance and the radius at the corner.

FIG. 7 is a similar view of another type of prior-art seal having flash at the lip edge.

DESCRIPTION OF SOME PRIOR-ART SEALS

FIG. 5 shows part of a fully-trimmed radial shaft seal having a lip body 10 which is molded with a hat 11 that must be trimmed off. A spring groove 12 is shown, and it will be noted that as molded, the inner molded wall 13 is frustoconical and will later define one side of the lip edge 14 or 15. After molding, another frustoconical wall 16 or 17 is made by trimming; the trimming may be done along either one of the two broken lines at 16 and 17 or somewhere in between them. This variation or "tolerance" was essential in this particular type of seal, due to the difficulties in trimming, and the variation brought on objections. The seals generally behaved very well, but they did not enable the manufacturer to obtain a constant cross section, and this automobile manufacturers began to insist upon. They wanted the relationship between the spring groove 12 and the actual lip edge 14 or 15 to be constant and reliable, and of course this was not the case where the lip edge 14 or 15 would be shifted both axially and radially, depending on the trimming conditions. It proved to be substantially impossible to meet the objections by improved trimming.

FIG. 6 shows another prior-art seal body 20 representing a partially-trimmed, partially-molded lip. Here, lip edge 21 is precisely located relative to a spring groove 22. At the edge 21, the molded frustoconical inner lip wall 23 meets an oppositely inclined molded frustoconcial portion 24, but most of the outer wall is shaped by trimming. A hat 25 is formed during molding; it is spaced away from the lip 21, and the trim surface 26 or 27 is provided along one of the broken lines shown, lying at an angle of about 5° to the portion 24. Here again, there was too much variation although the trimming could be somewhat more accurate than in the older trimmed seal of FIG. 5, and so there was some variation in cross section.

There was better cross-section consistency in the FIG. 6 seal than in the fully-trimmed seal of FIG. 5, and the relationship between the spring groove 25 and the contact edge 21 was good. However, the solving of the old problems led to the creation of new problems in this type of structure. In the first place, it was difficult to make and maintain a sharp corner in the mold at the point where the lip edge 21 was to be formed. Wherever a mold has to be machined, it is very difficult to get a sharp corner. The usual result is a slight radius, and radii at these points are not appreciated because they cannot give truly sharp lip edges 21, and a curved lip edge does not give the same result as a sharp lip edge. Moreover, since there were endeavors to make this corner as sharp as it could be, there was poor compound flow at the corner; also, the mold tended to get dirty at the corner and was very difficult to clean because of the blined corner.

Thus, in spite of the improved consistency of the seal cross section, the seal resulting from the structure of FIG. 6 has not been fully satisfactory but has lead instead to many mold defects due to dirt getting into the corner or to poor compound flow or to too round a corner in the first place.

Another development is shown by the seal 30 in FIG. 7 in which both frustoconical walls 31 and 32 are molded. At the lip edge 33 flash 34 occurs due to the mold parts mating there. The spring groove 35 lies opposite the lip edge 33 at a predetermined location, and good geometrical consistency can be obtained. However, the flash 34 at the contact point 33 is inconsistent, as is always the case in molding elastomers, depending upon the method of joining the mold parts. The flash 34 varies in size and, as a result, there are defects produced in the seal when the flash is taken off by freezing or other deflashing techniques. Moreover, the corner between the two mold parts is difficult to keep sharp and clean, since it is a strong bearing point.

DESCRIPTION OF A PREFERRED EMBODIMENT OF THE INVENTION

FIGS. 1 to 4 illustrate the present invention. Here, by way of example, a seal 50 has a metal reinforcing member or case 51 with a cylindrical bore-engaging portion 52, a radially extending flange 53 and an anchor portion 54 at the radially inner rim of the flange 53. Different types of cases may be used. Elastomer 55 is molded to this case 51 in the mold, and, so far as the present invention is concerned, is provided with a *mostly* molded lip edge 56. In distinction to the seal 20 of FIG. 6, the hat portion 57 is provided right *at* the lip edge 56, and, in distinction to the seal 30 of FIG. 7, the hat 57 is an actual precision-made hat rather than flash, which can be greater or lesser and vary with the conditions of the mating surfaces. The hat 57 is always of a predetermined dimension, and in all cases it is the same, thin and small in proportion to the face 58. Moreover, the inner frustoconical wall 58 and the outer frustoconical wall 59 of the seal are molded to their final shapes except for the point where the hat 57 is joined.

As shown in FIG. 3, the mold 60 comprises a lower member 61, an upper member 62, and an annular member 63, and the upper member 62 and lower member 61 are made so that there is a shelf 64 on the lower member on which the elastomer may initially be placed in the form of prep and a shelf 65 in the upper member 62 which comes against that elastomer to force it into the mold cavity. The lip edge 56 itself is precise on one side, and can be made quite precise, since there is good elastomeric flow in this mold 60. On the other side of the lip edge 56, the mold 60 provides for the hat 57, and then a face 66 of the upper mold 62 provides the frustoconical face 58, which again is always consistent because the mold stops at the same place each time.

The hat portion 57 is trimmed off by positioning a knife directly against the face 58, so that the knife is always located at the same point. Thus the invention provides a seal 50 with the lip cross section constant and with a trimmed sharp contact edge 56. A hydrodynamic sealing device 67 can be incorporated to compensate for damaged shafts or damaged seals, and this is readily done in this invention, whereas it is difficult to do this in partially molded lips as heretofore described. Non-hydrodynamic seals are, of course, completely feasible to make by this method. Moreover, the mold 60 is easily cleaned— no difficulties at all in this—and is easily kept in good condition so that rejects are minimized.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A method for making a shaft seal of the type having a rigid case with a radially extending flange and an elastomeric sealing element with a lip having a sharp edge, comprising
   simultaneously molding said sealing element while bonding it to said case flange and while providing a shaped lip cross section with two oppositely sloping faces converging toward a circular line, and
   while simultaneously providing a thin hat portion connected to said line on the face which is on that side of said line lying further from said flange, said hat portion sloping substantially in line with the face lying on the side of said line nearest to said flange,
   curing said elastomer in the mold,
   removing the molded seal with its hat from the mold, and
   cutting said hat from said seal with a knife held directly against the face on said further side of said line, thereby to provide said sharp edge.

References Cited
UNITED STATES PATENTS

| | | | |
|---|---|---|---|
| 3,246,369 | 4/1966 | Rhoads et al. | 425—Dig. 47 |
| 2,949,635 | 8/1960 | Chiero | 264—268 UX |
| 3,536,806 | 10/1970 | Jackson | 264—273 X |
| 3,079,632 | 3/1963 | Peickü | 425—Dig. 47 |
| 3,392,226 | 7/1968 | McKinven, Jr. | 264—268 |

ROBERT F. WHITE, Primary Examiner

A. M. SOKAL, Assistant Examiner

U.S. Cl. X.R.

264—268; 425—Dig. 47